(12) United States Patent
Littlejohn et al.

(10) Patent No.: US 10,958,520 B2
(45) Date of Patent: Mar. 23, 2021

(54) METHOD FOR GENERATING NETWORK OPTIMIZING INFORMATION

(71) Applicant: RISC Networks, LLC, Asheville, NC (US)

(72) Inventors: Jeremy Lynn Littlejohn, Fairview, NC (US); Gregory Evan Watts, Nottingham, NH (US)

(73) Assignee: Risc Networks, LLC, Asheville, NC (US)

(*) Notice: Subject to any disclaimer, the term of this patent is extended or adjusted under 35 U.S.C. 154(b) by 0 days.

(21) Appl. No.: 15/706,683

(22) Filed: Sep. 16, 2017

(65) Prior Publication Data

US 2018/0006887 A1 Jan. 4, 2018

Related U.S. Application Data

(63) Continuation of application No. 13/543,967, filed on Jul. 9, 2012, now abandoned.

(51) Int. Cl.
| | |
|---|---|
| *H04L 12/24* | (2006.01) |
| *G06Q 10/10* | (2012.01) |
| *H04L 12/26* | (2006.01) |

(52) U.S. Cl.
CPC ......... *H04L 41/0823* (2013.01); *G06Q 10/10* (2013.01); *H04L 41/14* (2013.01); *H04L 43/08* (2013.01); *H04L 43/18* (2013.01)

(58) Field of Classification Search
CPC ............. H04L 43/0823; H04L 43/0864; H04L 43/0811; H04L 43/00; H04L 41/06; H04L 43/04; H04L 43/0847; H04L 43/0852; H04L 43/087; H04L 43/16; H04L 63/14; H04L 63/1416; H04L 43/18; H04L 41/065; H04L 41/00; H04L 41/0823;
(Continued)

(56) References Cited

U.S. PATENT DOCUMENTS

6,823,382 B2 * 11/2004 Stone ................... G06F 11/0715
709/202
7,069,480 B1 * 6/2006 Lovy .................... G06F 11/3495
714/47.2
(Continued)

*Primary Examiner* — Glenton B Burgess
*Assistant Examiner* — Rachel J Hackenberg
(74) *Attorney, Agent, or Firm* — Knobbe, Martens, Olson & Bear LLP (57) ABSTRACT

There is provided a method for generating network optimizing information including the steps of identifying system devices that are comprised in a network, collecting metrics from the identified system devices, including collecting at least one metric relating to the operation, status, capability, limitations, expandability, scalability, or performance of the system devices, assessing the collected metrics according to a predetermined assessment protocol, generating a roster of metrics of interest, such metrics of interest being a group of the collected metrics that meet a selection criteria and not including other collected metrics that do not meet the selection criteria, and presenting each of the metrics of interest in a format suitable for a network operator to take corrective actions with regard to the identified non-compliant metrics or to capitalize on the identified optimization opportunities with respect to the network.

20 Claims, 5 Drawing Sheets

(58) Field of Classification Search
CPC ........... G06F 2201/865; G06F 2201/86; G06F 11/3409; G06F 11/34; G06F 11/30
See application file for complete search history.

(56) References Cited

U.S. PATENT DOCUMENTS

| | | | |
|---|---|---|---|
| 7,444,263 B2* | 10/2008 | White | G06F 11/3409 |
| | | | 700/51 |
| 2005/0065805 A1* | 3/2005 | Moharram | G06Q 10/06375 |
| | | | 705/7.37 |
| 2007/0028142 A1* | 2/2007 | Elsner | H04L 43/045 |
| | | | 714/25 |
| 2011/0087924 A1* | 4/2011 | Kandula | G06F 11/0709 |
| | | | 714/26 |
| 2011/0231361 A1* | 9/2011 | Patchava | G06F 21/50 |
| | | | 707/602 |
| 2012/0054331 A1* | 3/2012 | Dagan | G06F 11/0712 |
| | | | 709/224 |

* cited by examiner

Summary of Results

Analytic Check Summary

The following are the results of the Solution Mapper Analytic Checks. Below are the total number of failed checks broken out by technology area

| Technology | # Failed |
|---|---|
| Network: | 14 |
| Server: | 5 |
| UC: | 1 |
| Total: | 20 |

Top Solutions

| Top 3 or 12 Potential Solutions |
|---|
| Service Solutions |

| Vendor | Subcategory | Approximate Cost | Solution |
|---|---|---|---|

← 484

16 Problem(s) Resolved by Solution

| Product Solution |
|---|

| Vendor | Subcategory | Approximate Cost | Solution |
|---|---|---|---|
|  | UC | Contact Provider |  |

← 486

3 Problem(s) Resolved by Solution

| Product Solution |
|---|

| Vendor | Subcategory | Approximate Cost | Solution |
|---|---|---|---|
|  | UC | Contact Provider |  |

METHOD FOR GENERATING NETWORK OPTIMIZING INFORMATION

RELATED APPLICATIONS

This application is a continuation application of U.S. application Ser. No. 13/543,967, filed Jul. 9, 2012.

BACKGROUND OF THE INVENTION

U.S. Pat. No. 7,444,263 to White et al points out that the efficient, optimum operation of large, complex systems, such as web-based enterprise systems, requires the monitoring, careful analysis and identification of system metrics that reflect the performance of the system and the use of information regarding system metrics to identify probable root causes of performance problems in complex, distributed, multi-tier applications. According to White et al '263, such metrics, which in general relate to the operation of database systems and application servers, operating systems, physical hardware, network performance, and so on, all must be monitored across networks that may include many computers, each executing numerous processes, so that problems can be detected and corrected when or preferably before they arise.

White et al '263 further points out that several known system monitoring methods have attempted to identify and monitor only the metrics and combinations of metrics that are significant in representing the operation of a system and in detecting any abnormalities therein. However, according to White et at '263, the complexity of modern systems and the large number of possibly significant metrics and combinations of metrics lead to circumstances in which a monitoring system or operator may miss monitoring at least some of the significant metrics or combinations of metrics.

One possible solution, according to White et al '263, is to clearly and unambiguously identify and provide information pertaining to only those metrics or combinations of metrics that are of significance to or usefully represent and reflect the performance of the system, such as abnormalities in system operation. However, according to White et at '263, the clear and unambiguous identification and presentation of metrics and combinations of metrics accurately reflecting system performance or problems, in turn, involves a number of data collection and processing operations, each of which involves unique and significant problems that have seriously limited the capabilities of known performance monitoring systems and, as a consequence, the performance of the systems being monitored.

It is thus clear that there is a need to measure the metrics of a network system, and especially to measure those metrics that truly indicate the performance of the network system. However, even the clear and unambiguous identification and presentation of system metrics that reflect the performance of the network system does not fully put the network system operator in a favorable position to resolve the root causes that cause "out-of-limits" system metrics. Moreover, merely presenting clear and unambiguous identification and presentation of system metrics does not assist a network system operator in evaluating the desirability of, and/or the need for, improvements or enhancements to the existing network system, up to and including fully replacing the existing network system with a more robust network system. Thus, the need exists for a method for generating network optimizing information, whereupon this network optimizing information can provide a network operator with tools to remediate current problems with a network, such as bottleneck and undercapacity issues, as well as tools to guide an expansion and enhancement of the network. Additionally, the need exists for a system and a device for implementing such a method.

SUMMARY OF THE INVENTION

One object of the present invention is to provide a method for generating network optimizing information, whereupon this network optimizing information can provide a network operator with tools to remediate current problems with a network, such as bottleneck and under capacity issues, as well as tools to guide an expansion and enhancement of the network.

According to one aspect of the present invention, there is provided a method for generating network optimizing information including the steps of identifying system devices that are comprised in a network, collecting metrics from the identified system devices, including collecting at least one metric relating to the operation, status, capability, limitations, expandability, scalability, or performance of the system devices, assessing the collected metrics according to a predetermined assessment protocol, generating a roster of metrics of interest, such metrics of interest being a group of the collected metrics that meet a selection criteria and not including other collected metrics that do not meet the selection criteria, and presenting each of the metrics of interest in a format suitable for a network operator to corrective actions with regard to the identified non-compliant metrics or to capitalize on the identified optimization opportunities with respect to the network.

According to another aspect of the present invention, there is provided a system for performing a method for generating network optimizing information, wherein the method includes the steps of identifying system devices that are comprised in a network, collecting metrics from the identified system devices, including collecting at least one metric relating to the operation, status, capability, limitations, expandability, scalability, or performance of the system devices, assessing the collected metrics according to a predetermined assessment protocol, generating a roster of metrics of interest, such metrics of interest being a group of the collected metrics that meet a selection criteria and not including other collected metrics that do not meet the selection criteria, and presenting each of the metrics of interest in a format suitable for a network operator to corrective actions with regard to the identified non-compliant metrics or to capitalize on the identified optimization opportunities with respect to the network.

Also according to the present invention, the method for generating network optimizing information may include the step of presenting each of the metrics of interest in a format that identifies the assisting resource as a vendor offering services in resolving identified non-compliant metrics or capitalizing on the identified optimization opportunities. Moreover, wherein the step of presenting each of the metrics of interest in a format may optionally include presenting at least one of the metrics of interest in a format that identifies a vendor which has been selected to be presented in preference to other vendors. Still further, in connection with the vendor which has been selected to be presented in preference to other vendors, the vendor may be selected as a function of a step of evaluating a group of vendors and determining that the vendor is the most suitable vendor for offering services relating to the particular metric of interest. This step of evaluating a group of vendors may optionally include considering whether a vendor has paid value for an opportunity to be among the group of evaluated vendors.

According to a further feature of the one aspect of the present invention, the method further comprises the step of providing information concerning the presence or absence of commonality between a property or value of a metric of interest and the properties and values of a selected group of the same metric measured among other network operators. This step of providing information to concerning the presence or absence of commonality can include assigning a peer group classification to a network to classify the network relative to other networks that have been evaluated by the method.

Other aspects, embodiments and advantages of the present invention will become apparent from the following detailed description which, taken in conjunction with the accompanying drawings, which illustrate the principles of the invention by way of example.

BRIEF DESCRIPTION OF THE DRAWINGS

The foregoing and other objects, features and advantages of the present invention, as well as the invention itself, will be more fully understood from the following description of various embodiments when read together with the accompanying drawings, in which.

DETAILED DESCRIPTION OF THE INVENTION

Figure 1:
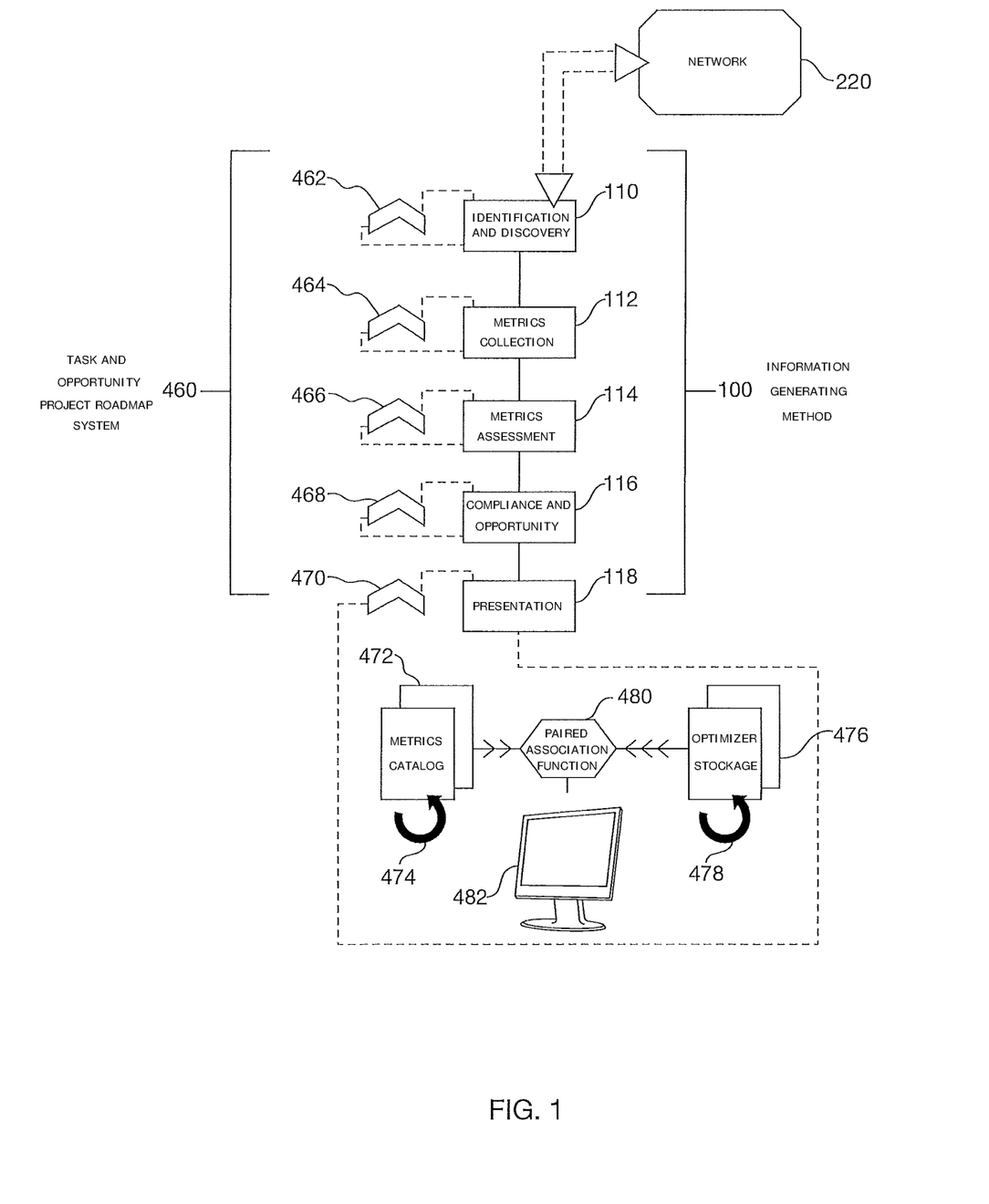
FIG. 1 is a schematic illustration of the method of the present invention.
Figure 2:
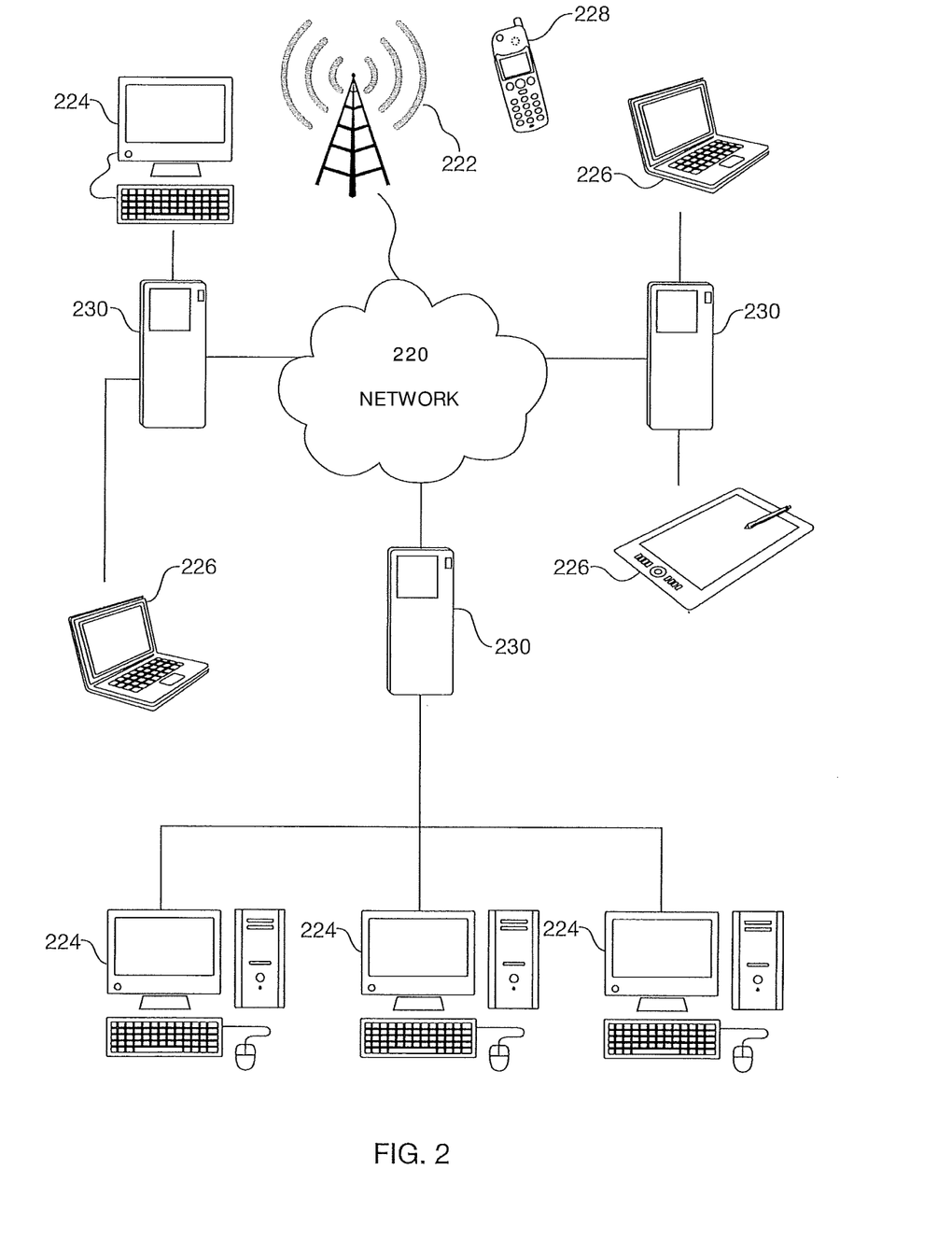
FIG. 2 is a schematic illustration of an exemplary network about which the method of the present invention can provide highly useable, readily referenced network intervention and network growth guiding information for the network operator.

Reference is had to FIG. 1, which is a schematic illustration of the method of the present invention and to FIG. 2, which is a schematic illustration of an exemplary network about which the method of the present invention can provide highly useable, readily referenced network intervention and network growth guiding information for the network operator. This method, hereinafter denominated as a method for generating network optimizing information, can provide a network operator with tools to remediate current problems with a network, such as bottleneck and undercapacity issues, as well as tools to guide an expansion and enhancement of the network.

The information generating method is configured for use with a network and, as seen in FIG. 2, an exemplary network 220 is to be understood as representing any information technology or "IP" arrangement operable to store, manipulate, and present information to the network operator. As seen in FIG. 2, the exemplary network 220 can comprise components enabling the network to operate as a local area network, a wide area network such as the Internet, and/or a wireless network operable to receive a wireless signal from a transmitter 222. The computers comprised by the network 220 may include desktop computers 224, lap-top computers 226, hand-held computers 228 (including wireless devices such as wireless personal digital assistants (PDA) or mobile phones), or any other type of computational arrangement of hardware and/or software. The several computers may be connected to the network 220 via a server 230. It should be noted that any other type of hardware or software may be included in the system and be considered a component thereof.

Figure 3:
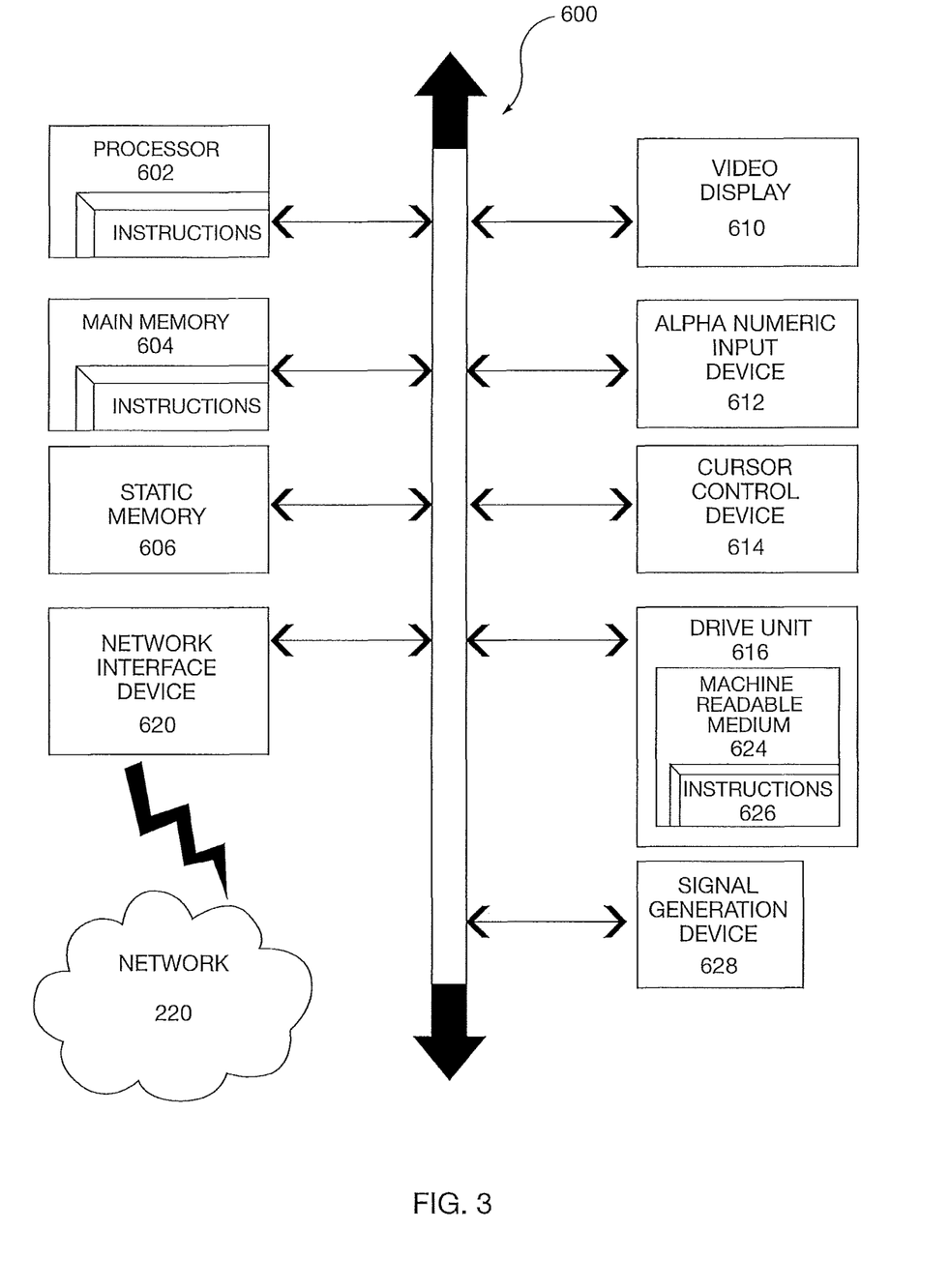
FIG. 3 is a schematic representation of a typical computer of a network of the type about which the method of the present invention can provide highly useable, readily referenced network intervention and network growth guiding information for the network operator.

It can thus be understood that the "IT" arrangement exemplified by the network 220 comprises one or more computers in the general sense. In this connection, reference is had to FIG. 3, which is a schematic representation of a typical computer 600 and the computer 600 includes a processor 602, a main memory 604 and a static memory 606, which communicate with each other via a bus 608. The computer 600 may further include a video display unit 610 (e.g., a liquid crystal display (LCD) or a cathode ray tube (CRT)). The computer 600 also includes an alphanumeric input device 612 (e.g., a keyboard), a cursor control device 614 (e.g., a mouse), a disk drive unit 616, a signal generation device 618 (e.g., a speaker), and a network interface device 620. The disk drive unit 616 includes a machine-readable medium 624 on which is stored a set of instructions implemented as software 626. The software 626 is also shown to reside, completely or at least partially, within the main memory 604 and/or within the processor 602. The software 626 may further be transmitted or received via the network interface device 620 and a signal generation device 628 is also provided. It is to be understood that any suitable embodiment of a computer may form a portion or the entirety of the network 220 in that a computer is to be regarded as a machine readable medium including any mechanism for storing or transmitting information in a form readable by a machine. For example, a machine readable medium includes read-only memory (ROM); random access memory (RAM); magnetic disk storage media; optical storage media; flash memory devices; or any other type of media suitable for storing or transmitting information.

As illustrated in FIG. 1, the information generating method 100 is comprised of a number of core steps that are operably interconnected to one another in a manner to produce a highly useable, readily referenced intervention and growth guide for the network operator. The order in which the steps of the information generating method 100 are described herein is not intended to be limiting insofar as connoting a preferred or necessary order in which the steps must be executed but it is to understood that particular requirements such as, for example, the need for particular data to be available, may necessitate that certain steps cannot be executed until other predetermined steps have already been executed.

A device identification and discovery step 110 includes identifying the existence of, and the identifying addresses of, system devices, which is intended to broadly encompass hardware and software elements of computers and other forms of processing units, interconnecting networks, storage units, databases, and application servers. Data is then collected, during a metrics collection step 112, from the identified system devices and the particular data targeted to be collected is referred to as "metrics" and metrics can be generally understood as information relating to the operation, status, capability, limitations, expandability, scalability, and/or performance of the system devices.

The metrics gathered during the metrics collection step 112 are then subjected to a "daylighting" step 114 via which the metrics are assessed in accordance with any suitable or preferred assessment protocol. For example, each of the gathered metrics may be assessed with regard to its compliance or non-compliance with a predetermined "in-compliance" value range. Additionally, the upper and lower limits of the "in-compliance" value range can be dynamically—updated after each execution cycle of the information generating method 100 or these upper and lower limits can be held static until updated at other predetermined milestones.

A compliance tracking and opportunity spotting step 116 is performed to generate a roster of those metrics that were identified during the daylighting step 114 as being of interest for the reason, for example, that the particular metric was assessed as falling outside of its associated predetermined "in-compliance" value range or for the reason that a particular metric reveals that there may be an opportunity to re-configure, add to, or otherwise further optimize the network. The assessment of whether a given metric should be regarded as a metric of interest may involve, for example, generating a normalized scoring of the deviation of the given metric of interest from an "in-compliance" range of values and this normalized scoring of the deviation of each metric of interest from its current threshold bounds permits a comparison and correlation of metric deviations.

In what will customarily be the last-to-be performed step of the core steps of the information generating method 100, an analyzed metric display step 118 is performed. During this core step, each of the metrics of interest identified during the compliance tracking and opportunity spotting step 116 is presented in a format suitable for the network operator to, at the least, have a listing of the identified non-compliant metrics and/or optimization opportunities and, preferably, have a "roadmap" for undertaking corrective actions with regard to the identified non-compliant metrics and/or capitalize on the identified optimization opportunities. It is to be understood that the term "display" is used in a broad sense and encompasses all forms of communication in visual, aural, and tactile format and including both human- and machine-interface variations.

Having now provided an overview of the information generating method 100, reference is further had to FIG. 1 for a description of a system of the present invention that is operable to execute the core steps of the information generating method 100 (as well as any supplemental steps that may be comprised in the information generating method 100) in a manner that achieves the goal of producing a highly useable, readily referenced intervention and opportunity guide for the network operator. This system, which is herein designated as the Task and Opportunity Project Roadmap or "TOPPER" system 460, is embodied in a plurality of selected hardware and software elements and, in this connection, may include functional operating units permitted to access the network 220 for the purpose of performing a cycle of the information generating method 100 and such a functional operating unit could be in the form, for example, of an on-site appliance or a remotely operated appliance.

A description will now be provided of several platforms of the TOPPER system 460 and including a description of the configuration and operation of these platforms in executing the core steps of the information generating method 100, it being understood that each platform of the TOPPER system 460 is configured from an appropriate arrangement of the hardware and software elements of the TOPPER system 460. The TOPPER system 460 includes a location platform 462 that executes the sub-steps of the device identification and discovery step 110 of the information generating method 100, a harvesting platform 464 that executes the sub-steps of the metrics collection step 112 of the information generating method 100, an evaluation platform 466 that executes the sub-steps of the daylighting step 114 of the information generating method 100, a reference base platform 468 that executes the sub-steps of the compliance tracking and opportunity spotting step 116 of the information generating method 100, and a dashboard platform 470 that executes the sub-steps of the analyzed metric display step 118 of the information generating method 100.

It is to be understood that each of the location platform 462, the harvesting platform 464, the evaluation platform 466, the reference base platform 468, and the dashboard platform 470 may be an independently configured and operated arrangement of the hardware and software elements of the TOPPER system 460, or may alternatively be located within another arrangement of the hardware and software elements of the TOPPER system 460 that itself is the location of another one of the platforms of the TOPPER system 460.

The dashboard platform 470 of the TOPPER system 460 is configured to maintain a metrics catalog 472 and to perform a metrics catalog update loop 474. Also, the dashboard platform 470 of the TOPPER system 460 is configured to maintain a potential optimizer stockage 476 and to perform a potential optimizer update loop 478. The dashboard platform 470 of the TOPPER system 460 performs a paired association function 480 via which a metric of interest (which has been determined to be an existing metric already cataloged in the metrics catalog 472 or which has been added to the metrics catalog 472 via the execution of a cycle of the metrics catalog update loop 474) and a potential optimizer stocked in the potential optimizer stockage 476 are associated with one another. In this connection, the metric of interest can be an existing metric already cataloged in the metrics catalog 472 or a metric that has been added to the metrics catalog 472 via the execution of a cycle of the metrics catalog update loop 474. Each paired metric of interest and potential optimizer is communicated to the dashboard platform 470 which then displays the paired items to the network operator in a manner to be described in more detail below.

In addition to displaying each paired metric of interest and potential optimizer, the dashboard platform 470 provides further information that can assist the network operator in better resolving a reported non-compliance situation or in identifying opportunities for the network operator to enhance the network. In this regard, the dashboard platform 470 may be configured to provide an intentionally ordered presentation of the respective group of paired metrics of interest and potential optimizers that are yielded at the end of a given complete cycle of the information generating method 100—that is, a presentation of information to the network operator with selected clusters of the information being communicated visually, aurally, etc. to the network operator before other clusters of the information are communicated. The intentionally ordered presentation of the paired metrics of interest and potential optimizers may be arranged, for example, so as to provide the network operator with a hierarchal listing of paired metrics of interest and potential optimizers based upon a given criticality ranking of the metrics. As another example, the intentionally ordered presentation of the paired metrics of interest and potential optimizers may be so arranged, for example, so as to provide the network operator with a hierarchal listing of paired metrics of interest and potential optimizers based upon directing the network operator to preferred resources that can help resolve metrics issues or capitalize upon identified opportunities. Further in this connection, the preferred resources can be comprised of vendors who have a particular capability or vendors who are given preference relative to other vendors based upon a sponsorship criteria (i.e., "sponsored" vendors are given a preferential showing in the display provided by the dashboard platform 470 as opposed to "non-sponsored" vendors).

Figure 4:
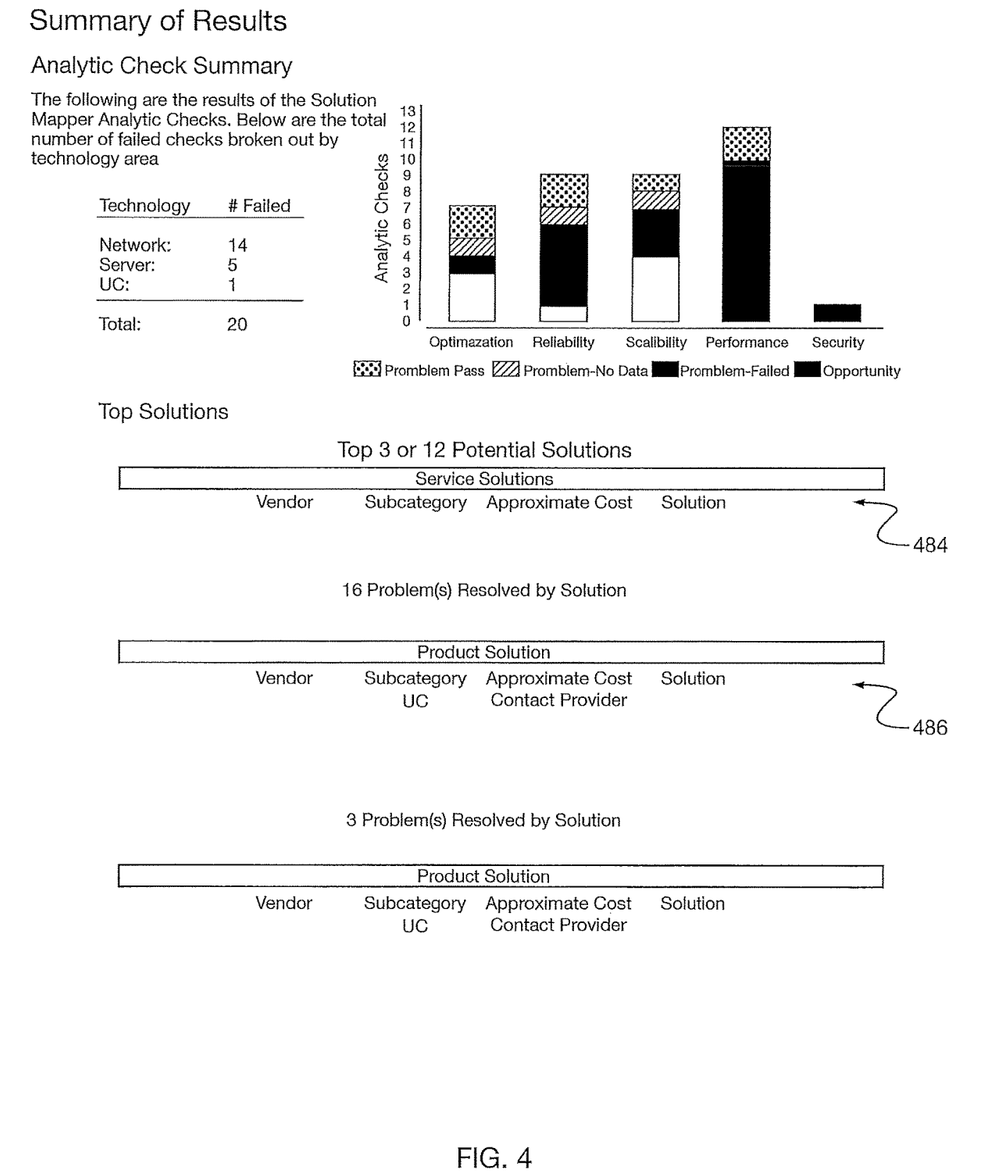
FIG. 4 is a diagrammatic illustration of metric correlation relationships.

Reference is now had to FIG. 4, which is a schematic representation of one format displayed by the dashboard, wherein it can be seen that the dashboard 470 visually displays an intentionally ordered presentation of one metric of interest and potential optimizers. The exemplary format displayed by the dashboard 470 in FIG. 4 includes a "banner"-type listing 484 comprising information about a "sponsored" vendor and this "banner"-type listing 484 is presented in a text and graphics format. The "banner"-type listing 484 is presented as the topmost one of a vertical listing of vendors which offer services relating the respective metric of interest. For the purposes of illustration, it is assumed that the other vendors 486 listed below the "banner"-type listing 484 are "non-sponsored" vendors. Information about the other vendors 486 listed below the "banner"-type listing 484 are displayed in a text-only format or in another format selected to be less noticeable than the "banner"-type listing 484 comprising information about a "sponsored" vendor. Thus, by virtue of its listing on the vertical listing of vendors and its more noticeable presentation in both text and graphics, as opposed to text alone, the "banner"—type listing 484 comprising information about a "sponsored" vendor is given a preferential showing in the display provided by the dashboard platform 470 as opposed to the "non-sponsored" vendors 486. Banner-type listings may be comprised solely of graphic, graphics and text, or text only and may include, for example, rich media (audio/video), promotions, or any feature that increases the value of listing to a vendor or a potential vendor willing to give value in return for a status as a "sponsored" vendor.

The dashboard platform 470 can additionally be configured to provide information to the network operator concerning the presence or absence of commonality between a property or value of a metric of interest and the properties and values of a selected group of the same metric measured among other network operators. This "metric neighborhood" comparator function conveniently provides the network operator with a reference point to be factored in when considering, for example, the priority to be ascribed to remediating a metric of interest or the paths upon which to expand or re-adjust the capabilities of the network 220. The dashboard platform 470 can communicate the paired metrics of interest and potential optimizers, and the further information that can assist the network operator in better resolving a reported non-compliance situation or in identifying opportunities for the network operator to enhance the network, via any suitable format such as, for example, an interactive screen 482 accessible by the network operator.

Figure 5:
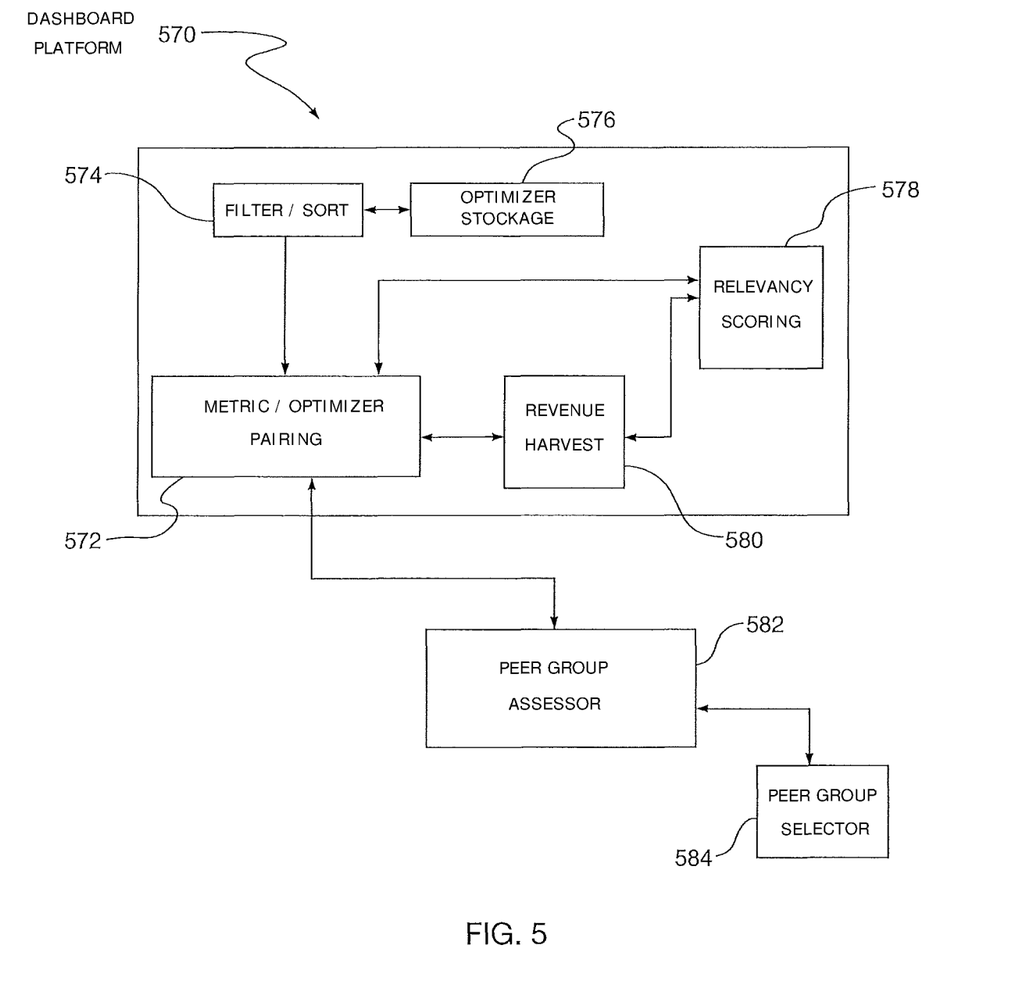
FIG. 5 is a schematic representation of further details of the dashboard platform.

Reference is now had to FIG. 5, which is a schematic representation of further details of the dashboard platform. A dashboard platform 570 may be configured to provide an intentionally ordered presentation of the respective group of paired metrics of interest and potential optimizers that are yielded at the end of a given complete cycle of the information generating method 100—that is, a presentation of information to the network operator with selected clusters of the information being communicated visually, aurally, etc. to the network operator before other clusters of the information are communicated. The intentionally ordered presentation of the paired metrics of interest and potential optimizers may be arranged, for example, so as to provide the network operator with a hierarchal listing of paired metrics of interest and potential optimizers based upon a given criticality ranking of the metrics. As another example, the intentionally ordered presentation of the paired metrics of interest and potential optimizers may be so arranged, for example, so as to provide the network operator with a hierarchal listing of paired metrics of interest and potential optimizers based upon directing the network operator to preferred resources that can help resolve metrics issues or capitalize upon identified opportunities. Further in this connection, the preferred resources can be comprised of vendors who have a particular capability or vendors who are given preference relative to other vendors based upon a sponsorship criteria (i.e., "sponsored" vendors are given a preferential showing in the display provided by the dashboard platform 570 as opposed to "non-sponsored" vendors). The metric/optimizer pairing facility 572 receives a "pairing" request from the dashboard platform 570. The metric/optimizer pairing facility 572 commands a filter sort 574 to retrieve a single potential optimizer from a potential optimizer stockage 576 or to retrieve a plurality of potential optimizers from the potential optimizer stockage 576. The metric/optimizer pairing facility 572 generates a conditional set that comprises one or more of potential optimizers that comply in a meaningful way with the pairing request. Potential optimizers may be in the format of a text presentation, a text and graphics presentation, and may be in the nature of a "banner" ad, and/or include audio files, video files, etc. The conditional set is forwarded by the metric/optimizer pairing facility 572 to a relevancy scoring facility 578 that determines a relevancy score for each potential optimizer contained in the conditional set. A relevancy score can be composed based upon, for example, the degree of responsiveness that the potential optimizer offers to resolve or respond to the metric of interest. The relevancy scoring facility 578 transmit each potential optimizer of the conditional set to a revenue harvest facility 580 which is operated to rank or order the received potential optimizer as a function of a predetermined ranking schematic. For example, the revenue harvest facility 580 may function to assign a superior rank to a given potential optimizer in contrast to the rank that the revenue harvest facility 580 assigns to a different potential optimizer, with this different ranking being made on the basis that the first noted potential optimizer will direct the user to a vendor that delivers services in a more reliable and/or affordable manner than the different vendor associated with the second noted potential optimizer. Alternatively, the revenue harvest facility 580 may function to assign a superior rank to a given potential optimizer in contrast to the rank that the revenue harvest facility 580 assigns to a different potential optimizer, with this different ranking being made on the basis that the first noted potential optimizer will direct the user to a vendor that has paid value to the operator of the dashboard platform 570 for a ranking preference consideration while the different vendor associated with the second noted potential optimizer has not paid value to the operator of the dashboard platform 570 for a ranking preference consideration. As noted, the dashboard platform can additionally be configured to provide information to the network operator concerning the presence or absence of commonality between a property or value of a metric of interest and the properties and values of a selected group of the same metric measured among other network operators and this "metric neighborhood" comparator function can be configured in a variety of ways to selectively change the respective "peer" group of networks that have been assessed by the method of the present invention and which share the commonality of the presence or absence of a property or value of a particular metric of interest. Thus, with continuing reference to FIG. 5, the dashboard 570 includes a peer group assessor 582 operably connected to the metric/optimizer pairing facility 572 and operable to assess each metric of interest and make a determination as to which "peer" group to appropriately classify the metric of interest. The peer group assessor 582 is coupled to a peer group selector device 584 which permits a user to selectively assign a given network having a respective metric of interest with a predetermined property or value to a relatively smaller "peer" group of networks having the same respective metric of interest with the predetermined property or value and having other shared commonality. Alternatively, a user can selectively assign this given network having the respective metric of interest with the predetermined property or value to a relatively larger "peer" group that comprises not only the relatively small "peer" group of networks but comprises, as well, other networks. For example, a user can operate the peer group selector device 584 to selectively assign the given network to a relatively smaller "peer" group of networks having the same respective metric of interest with the predetermined property or value and having the additional shared commonality of being networks operated by entities in the same industry group or entities offerings products or services to a similar category of customers. While an embodiment of the invention has been described and illustrated herein, it is to be distinctly understood that the invention is not limited thereto, but may be otherwise variously embodied and practiced within the scope of the following claims.

We claim:

1. A method comprising:
under control of a computing system comprising one or more computing devices configured to execute specific instructions,
identifying network resources in a networked environment, wherein the network resources comprise a plurality of network devices and a plurality of applications;
monitoring network communications among the network resources, the monitoring the network communications including collecting network metrics;
evaluating each network metric of the network metrics against a corresponding compliance range of values, wherein a compliant metric falls within the corresponding compliance range of values, wherein a non-compliant metric falls outside the corresponding compliance range of values, and wherein non-compliant metrics indicate corresponding deficiencies in the networked environment;
generating a normalized score for individual non-compliant metrics of the non-compliant metrics based at least partly on a degree to which the individual non-compliant metrics deviate from their corresponding compliance range of values;
identifying a metric of interest from the non-compliant metrics based at least partly on the normalized scores for the individual non-compliant metrics;
associating a deficiency, corresponding to the metric of interest, with a plurality of remedial resources for correcting the deficiency;
determining, for each remedial resource of the plurality of remedial resources, a respective relevancy score representing a degree of responsiveness to correct the deficiency;
determining a comparison property associated with the metric of interest for one or more additional networked environments separate from the networked environment; and
displaying, through an electronic interface, data regarding the metric of interest, the plurality of remedial resources, and the comparison property.

2. The method of claim 1, wherein a network metric of the network metrics includes data relating to operational status of the network resources.

3. The method of claim 1, wherein a network metric of the network metrics includes data relating to performance of the network resources.

4. The method of claim 1, further comprising ranking the plurality of remedial resources according to a priority.

5. The method of claim 1, further comprising ranking the plurality of remedial resources according to a preference.

6. The method of claim 1, further comprising identifying a peer group classification for the networked environment, wherein the peer group classification comprises a classification of the networked environment among the one or more additional networked environments.

7. The method of claim 1, further comprising generating a roster of metrics of interest, wherein the roster of metrics of interest comprises a subset of the network metrics, wherein individual metrics of interest of the roster of metrics of interest satisfy a selection criterion, and wherein individual network metrics of the network metrics not included in the roster of metrics of interest do not satisfy the selection criterion.

8. The method of claim 7, further comprising generating a hierarchical representation of the roster of metrics of interest and corresponding remedial resources.

9. A system comprising:
computer-readable memory storing executable instructions; and
one or more processors in communication with the computer-readable memory and configured by the executable instructions to at least:
identify network resources in a networked environment, wherein the network resources comprise a plurality of network devices and a plurality of applications;
determine network metrics based on monitoring network communications among the network resources;
evaluate each network metric of the network metrics against a corresponding compliance range of values, wherein a compliant metric falls within the corresponding compliance range of values, wherein a non-compliant metric falls outside the corresponding compliance range of values, and wherein non-compliant metrics indicate corresponding deficiencies in the networked environment;
generate a normalized score for individual non-compliant metrics based at least partly on a degree to which the individual non-compliant metrics deviate from their corresponding compliance range of values;
identify a metric of interest from the non-compliant metrics based at least partly on the normalized scores for the individual non-compliant metrics;

associate a deficiency, corresponding to the metric of interest, with a plurality of remedial resources for correcting the deficiency;

determine, for each remedial resource of the plurality of remedial resources, a respective relevancy score representing a degree of responsiveness to correct the deficiency;

determine a comparison property associated with the metric of interest for one or more additional networked environments separate from the networked environment; and display, through an electronic interface, data regarding the metric of interest, the plurality of remedial resources, and the comparison property.

10. The system of claim 9, wherein a network metric of the network metrics includes data relating to operational status of the network resources.

11. The system of claim 9, wherein a network metric of the network metrics includes data relating to performance of the network resources.

12. The system of claim 9, wherein the one or more processors are further configured by the executable instructions to rank the plurality of remedial resources according to a priority.

13. The system of claim 9, wherein the one or more processors are further configured by the executable instructions to rank the plurality of remedial resources according to a preference.

14. The system of claim 9, wherein the one or more processors are further configured by the executable instructions to identify a peer group classification for the networked environment, wherein the peer group classification comprises a classification of the networked environment among the one or more additional networked environments.

15. The system of claim 9, wherein the one or more processors are further configured by the executable instructions to generate a roster of metrics of interest, wherein the roster of metrics of interest comprises a subset of the network metrics, wherein individual metrics of interest of the roster of metrics of interest satisfy a selection criterion, and wherein individual network metrics of the network metrics not included in the roster of metrics of interest do not satisfy the selection criterion.

16. The system of claim 15, wherein the one or more processors are further configured by the executable instructions to generate a hierarchical representation of the roster of metrics of interest and corresponding remedial resources.

17. A computer-implemented method comprising:
as performed by a computing system comprising one or more processors configured to execute specific instructions, determining a plurality of network metrics for a networked environment based at least partly on monitoring network communications among network resources of the networked environment;

determining that a network metric of the plurality of network metrics is a non-compliant metric, wherein the non-compliant metric indicates a deficiency in the networked environment;

generating a normalized score for the non-compliant metric based at least partly on a degree to which the non-compliant metric deviates from a corresponding compliance range of values;

determining that the non-compliant metric is a metric of interest based at least partly on the normalized score;

associating the metric of interest with a plurality of remedial resources for correcting the deficiency;

determining, for each remedial resource of the plurality of remedial resources, a respective relevancy score representing a degree of responsiveness to correct the deficiency;

determining a comparison property associated with the metric of interest for one or more additional networked environments separate from the networked environment; and generating display data representing the metric of interest, the plurality of remedial resources, and the comparison property.

18. The computer-implemented method of claim 17, further comprising identifying a peer group classification for the networked environment, wherein the peer group classification comprises a classification of the networked environment among the one or more additional networked environments.

19. The computer-implemented method of claim 17, further comprising generating a roster of metrics of interest, wherein the roster of metrics of interest comprises the metric of interest and one or more additional network metrics, wherein individual metrics of interest of the roster of metrics of interest satisfy a selection criterion, and wherein individual network metrics of the network metrics not included in the roster of metrics of interest do not satisfy the selection criterion.

20. The computer-implemented method of claim 19, further comprising generating a hierarchical representation of the roster of metrics of interest and corresponding remedial resources.

* * * * *